(12) United States Patent
Itahara et al.

(10) Patent No.: US 6,806,218 B2
(45) Date of Patent: Oct. 19, 2004

(54) GRAIN ORIENTED CERAMICS, THERMOELECTRIC CONVERSION ELEMENT AND PRODUCTION PROCESS THEREOF

(75) Inventors: Hiroshi Itahara, Aichi-ken (JP); Shin Tajima, Aichi-ken (JP); Toshihiko Tani, Aichi-ken (JP); Kunihito Koumoto, Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/132,393

(22) Filed: Apr. 26, 2002

(65) Prior Publication Data

US 2003/0013596 A1 Jan. 16, 2003

(30) Foreign Application Priority Data

Apr. 26, 2001 (JP) ........................................ 2001-129058

(51) Int. Cl.$^7$ .................... C04B 35/01; C01G 51/04; H01L 35/22; H01L 35/34
(52) U.S. Cl. .................... 501/94; 501/123; 423/263; 423/594; 252/519.15; 252/519.13; 252/521.1; 252/521.2; 136/236.1
(58) Field of Search ................ 501/94, 123; 136/236.1; 423/263, 594; 252/519.15, 519.13, 521.1, 521.2

(56) References Cited

U.S. PATENT DOCUMENTS

| 6,093,338 A | 7/2000 | Tani et al. ............. 252/62.9 R |
| 6,376,763 B2 * | 4/2002 | Funahashi et al. .......... 136/201 |
| 6,544,444 B2 * | 4/2003 | Funahashi et al. ..... 252/519.15 |

FOREIGN PATENT DOCUMENTS

| JP | 3089301 | | 7/2000 |
| JP | 2000211971 | * | 8/2000 |
| JP | 2000-269560 | * | 9/2000 |

OTHER PUBLICATIONS

Siwen Li, et al., "High temperature thermoelectric properties of oxide $Ca_9Co_{12}O_{28}$", Journal of Materials Chemistry, 1999, vol. 9, pp. 1659–1660, no month.

Ryoji Funahashi, et al., "An Oxide Single Crystal with High Thermoelectric Performance in Air", Jpn. J. Appl. Phys., vol. 39, 2000, pp. 1127–1129, no month.

A.C. Masset, et al., "Misfit–layered cobaltite with an anisotropic giant magnetoresistance: $Ca_3Co_4O_9$", Physical Review B, vol. 62, No. 1, Jul. 1, 2000, pp. 166–175.

* cited by examiner

*Primary Examiner*—Karl Group
(74) *Attorney, Agent, or Firm*—Oblon, Spivak, McClelland, Maier & Neustadt, P.C.

(57) ABSTRACT

Grain oriented ceramics constituted of a polycrystalline body of a layered cobaltite in which a {001} plane of each grain constituting the polycrystalline body has an average orientation degree of 50% or more by the Lotgering's method. In this case, the layered cobaltite is preferably a layered calcium cobaltite expressed by the following general formula:
$\{(Ca_{1-x}A_x)_2CoO_3+\alpha\}(CoO_2+\beta)y$ (where A represents one or more elements selected among an alkali metal, an alkaline earth metal and Bi, $0 \leq x \leq 0.3$, $0.5 \leq y \leq 2.0$, and $0.85 \leq \{3+\alpha+(2+\beta)y\}/(3+2y) \leq 1.15$). Such grain oriented ceramics are obtained by molding a mixture of the first powder constituted of a $Co(OH)_2$ platelike powder and the second powder constituted of $CaCO_3$ and the like such that a developed plane of the platelike powder is oriented, and by heating the green body at a predetermined temperature.

27 Claims, 5 Drawing Sheets

GRAIN ORIENTED CERAMICS, THERMOELECTRIC CONVERSION ELEMENT AND PRODUCTION PROCESS THEREOF

BACKGROUND OF THE INVENTION

1. Field of the Invention

The present invention relates to grain oriented ceramics and a production process thereof, a platelike powder for producing the same, and a thermoelectric conversion element. More specifically, the present invention relates to the following: grain oriented ceramics suitable as a thermoelectric conversion material constituting thermoelectric conversion elements used in a variety of thermoelectric generators (including solar thermoelectric generators, thermoelectric generators using temperature difference in seawater, thermoelectric generator using fossil fuels and regenerators using waste heat from factories or automobiles), accurate temperature control devices (including a photodetector, a laser diode, a field-effect transistor, a photomultiplier, a cell of a spectrophotometer and a chromatographic column), thermostats, air conditioners, refrigerators and electrical power sources for clocks; and a production process thereof; a platelike powder for producing such grain oriented ceramics; and a thermoelectric conversion element using such grain oriented ceramics as the thermoelectric conversion materials.

2. Description of Related Art

Thermoelectric conversion means direct conversion between electric energy and thermal energy, taking advantage of the Seebeck effect or the Peltier effect. The thermoelectric conversion has attracted attention as a technology for high-efficiency energy use since it is characterized as, for example: 1) discharging no excess of waste products during energy conversion; 2) allowing effective use of waste heat; 3) enabling electric power to be generated continuously until the materials deteriorate; and 4) dispensing with a moving part such as a motor or a turbine, thus being maintenance-free.

As an index for evaluating the performance of materials capable of converting between thermal energy and electric energy, namely, thermoelectric conversion materials, it is common to use a figure of merit Z ($Z = S^2\sigma/K$, where S, $\sigma$ and K are a Seebeck coefficient, electrical conductivity and thermal conductivity, respectively) or a dimensionless figure of merit ZT expressed as a product of the value of the figure of merit Z and the absolute temperature T at which that value is shown. The Seebeck coefficient represents the magnitude of thermoelectric power generated by temperature difference of 1 K. The thermoelectric conversion materials have their specific values of the Seebeck coefficient, and they are classified into those having positive Seebeck coefficients (p-type) and those having negative ones (n-type).

In addition, typically, the thermoelectric conversion materials are used in a state of joining between the p-type and n-type materials. Such a joining pair is commonly called a thermoelectric conversion element. The figure of merit of a thermoelectric conversion element depends on the figure of merit $Z_p$ of the p-type thermoelectric conversion material, the figure of merit $Z_n$ of the n-type thermoelectric conversion material, and the forms of the p-type and n-type thermoelectric conversion materials. It is known that, if the forms of those materials are optimized, the figure of merit of the thermoelectric conversion element increases with increasing $Z_p$ and/or $Z_n$. Therefore, to obtain a thermoelectric conversion element having a high figure of merit, it is important to use thermoelectric conversion materials of which figures of merit $Z_p$ and $Z_n$ are high.

In these thermoelectric conversion materials, there have been known materials such as Bi—Te, Pb—Te, Si—Ge and oxide-ceramic systems. Among them, a Bi—Te system compound semiconductor exhibits excellent thermoelectric properties (ZT: approx. 0.8) near room temperature, and a Pb—Te system compound semiconductor does so in a middle-temperature range of 300–500° C. However, these compound semiconductors are difficult to use in a high-temperature range. In addition, there is a problem that those materials include expensive rare elements (such as Te, Sb or Se) or highly toxic substances which place a load on the environment (such as Te, Sb, Se or Pb).

On the other hand, a compound semiconductor of a Si—Ge system exhibits excellent thermoelectric properties in the high-temperature range around 1000° C., and its materials contain no environmentally hazardous substances. However, for prolonged use of the compound semiconductor of the Si—Ge system at high temperatures in air, it is required to protect the surfaces of its materials, which deteriorates the performances of the thermoelectric element.

In contrast to this, thermoelectric conversion materials of an oxide-ceramics system do not necessarily contain a rare element or an environmentally hazardous substance. In addition, their thermoelectric properties do not deteriorate greatly even if they are used for prolonged periods of time at high temperatures in air, meaning that they are excellent in heat endurance. Therefore, the thermoelectric conversion materials of oxide-ceramic systems have received attention as materials that can replace compound semiconductors, and there have been various propositions about new materials having excellent thermoelectric properties and about the processes for producing those materials.

For example, A. C. Masset et al. prepared a polycrystalline body and a single crystal of $Ca_3Co_4O_9$ that is a kind of layered oxide containing cobalt (hereinafter referred to as a "layered cobaltite"), and they evaluated the crystal structure and thermoelectric properties (see A. C. Masset et al., Phys. Rev. B, 62(1), pp.166–175, 2000). This literature mentions that $Ca_3Co_4O_9$ is a lattice misfit-layered oxide in which $Ca_2CoO_3$ layers having a rock-salt crystal structure and $CoO_2$ layers having a $CdI_2$-type crystal structure are stacked at a predetermined cycle along a c-axis.

In addition, the same literature mentions that specific resistance of $Ca_3Co_4O_9$ is anisotropic; the specific resistance is much smaller within the {001} plane than in the direction perpendicular to the {001} plane (i.e. along the c-axis). Furthermore, it also mentions that the Seebeck coefficient in the direction of the {001} plane of the $Ca_3Co_4O9$ single crystal reaches approximately 125 $\mu V/K$ in the neighborhood of 300 K and that the Seebeck coefficient has small dependence on temperature.

The "{001} plane" of the layered cobaltite denotes a plane having excellent thermoelectric properties, that is, a plane parallel to the $CoO_2$ layer. Many kinds of the layered cobaltite have not been clarified concerning their crystal structures. Moreover, their crystallographic axes and crystal planes are defined variously depending on what unit lattice is adopted. Nevertheless, the {001} plane is defined as above in the present invention.

Also, Japanese Patent Application Unexamined Publication No. 2001-19544, for example, discloses a sintered complex oxide of which composition is expressed by such a general formula as $Bi_2Sr_{2-x}Ca_xCo_2O_w$, $Bi_{2-y}Pb_ySr_2Co_2O$, $_w$ or $Bi_2Sr_{2-z}La_zCo_2O_w$ (where $0 \leq x \leq 2$, $0 \leq y \leq 0.5$, $0 < z \leq 0.5$) and which has a layered crystal structure and electrical conductivity of $1.0 \times 10^4$ S/m or higher. This publication also discloses a process of producing a complex oxide, in which to pelletize the powders including sources of Bi, Sr, Ca and Co, to heat the green body in oxygen with uniaxial pressing so as to partially melt part of the materials, and to make it cool slowly.

In addition, Japanese Patent Application Unexamined Publication No. 2000-269560 discloses a complex oxide assembly obtained by die-pressing $NaCo_2O_4$ crystals with 5 mm average grain size and 20 $\mu$m average thickness which is synthesized by the flux method, and by hot-pressing the compact body. This publication also discloses a process of producing a thin film of a complex oxide by forming a $NaCo_2O_4$ thin film on a substrate using the sputtering method.

The layered cobaltite such as $Ca_3Co_4O_9$ or $Bi_2Sr_{2-x}Ca_xCo_2O_w$ is a p-type thermoelectric conversion material having a relatively large Seebeck coefficient. Besides, its thermoelectric properties have anisotropy in accordance with its crystal orientation. Consequently, using a material in which a crystal plane having excellent thermoelectric properties (i.e. the {001} plane) is unidirectionally oriented allows maximum utilization of the anisotropy of thermoelectric properties, which can improve the figure of merit. In addition, it is expected that a thermoelectric conversion element using such materials may have a high figure of merit.

However, an ordinary ceramics production process, in which a mixture of simple compounds such as $CaCO_3$ or $Co_3O_4$ containing ingredient elements is calcinated, molded and sintered, is incapable of providing a sintered body of the layered cobaltite in which crystal planes having excellent thermoelectric properties are oriented unidirectionally.

On the other hand, Japanese Patent Unexamined Publication No. 2001-19544 mentions that, if part of the materials is partially melted with the compact body uniaxially pressurized and the green body is then cooled slowly, recrystallization takes place in the cooling process, which brings forth a sintered body constituted of grains in which the {001} plane has developed in a direction parallel to the pressurized plane. This method, however, is limited to particular substance systems and compositions in which recrystallization may provide a desired crystal. This presents a problem, for example, that the method cannot be applied to any system that causes phase separation or crystal structure change during crystallization.

In addition, as disclosed by Japanese Patent Application Unexamined Publication No. 2000-269560, according to the sputtering method, a $NaCo_2O_4$ thin film with the {001} plane preferred with a high orientation degree may be formed on a substrate by optimizing substances of the substrate, sputtering conditions, and the like. However, only a thin film can be obtained by the sputtering method; it is difficult to produce thermoelectric ceramics having a cross-sectional area large enough for practical use. On the other hand, it is difficult to produce thermoelectric ceramics having a high orientation degree merely by hot-pressing the coarse plate-like powder synthesized by the flux method.

Furthermore, it may be possible to crystallize a layered cobaltite as a single crystal for the purpose of orienting crystal planes that have excellent thermoelectric properties. However, there is also a problem that the production cost of single crystals is high. Moreover, it is usually difficult to prepare a bulk material of the order of millimeters in size for use in thermoelectric conversion, although small single crystals may be obtained.

SUMMARY OF THE INVENTION

The present invention has been made in view of the above circumstances and has an object to provide grain oriented ceramics which are composed of a layered cobaltite exhibiting excellent thermoelectric properties and which have a high figure of merit.

Another object of the present invention is to provide a production process of grain oriented ceramics, which is applicable to a wide range of ceramic systems regardless of substance systems, and which enables efficient production of a sintered body having a large cross-sectional area.

And yet, another object of the present invention is to provide a platelike powder suitable for producing such grain oriented ceramics.

Further, another object of the present invention is to provide a thermoelectric conversion element in which such grain oriented ceramics are used as thermoelectric conversion materials.

To achieve the objects and in accordance with the purpose of the present invention, as embodied and broadly described herein, grain oriented ceramics according to the present invention are constituted of a polycrystalline body of a layered cobaltite, and the {001} plane of each grain constituting the polycrystalline body has an orientation degree of 50% or more by the Lotgering's method.

In the more preferred embodiment, a rocking curve full width at half maximum measured for the {001} plane of the layered cobaltite is, preferably, 15 degrees or less.

The grain oriented ceramics according to the present invention are constituted of the polycrystalline body of the layered cobaltite exhibiting excellent thermoelectric properties. In addition, the {001} plane of each grain in such ceramics is oriented at a high orientation degree. As a result, the figure of merit in a direction parallel to the orientation direction of the {001} plane takes on a larger value than that of a non-oriented sintered body of the same composition.

Further, the production process of the grain oriented ceramics according to the present invention includes a material preparation step of preparing a material including a first powder with a crystal plane A which has lattice matching with a $CoO_2$ layer of a layered cobaltite, a molding step of molding the material such that the crystal plane A is oriented, and a sintering step of heating and sintering the green body obtained in the molding step.

In one preferred embodiment, the first powder may preferably be an anisotropically-shaped powder having the crystal plane A as its developed plane.

In another preferred embodiment, the first powder may preferably be a precursor of the layered cobaltite. In this case, the material preparation step may preferably be a step of preparing a material including the first powder and the second powder which reacts with the first powder thereby forming the layered cobaltite.

In still another preferred embodiment, the first powder may preferably be composed of the layered cobaltite.

Further, in another preferred embodiment, the molding step may preferably be a step of molding the material such that an average orientation degree of the crystal plane A may be 55% or more by the Lotgering's method.

When the material including the first powder is heated at a predetermined temperature, the crystal plane A of the first powder is succeeded to as the {001} plane of the layered cobaltite. Accordingly, orienting the crystal plane A in the green body and heating it at a predetermined temperature provide grain oriented ceramics in which platelike crystals of the layered cobaltite with the {001} plane developed are unidirectionally oriented.

In particular, the crystal plane A can be oriented easily if an anisotropically-shaped powder with the crystal plane A as its developed plane is used as the first powder. In this case, it is possible to obtain grain oriented ceramics with the {001} plane oriented at a high orientation degree.

In addition, in the case of producing an oriented sintered body composed of the layered cobaltite, the orientation degree of the {001} plane of the layered cobaltite in the sintered body depends greatly on the orientation degree of the crystal plane A of the first powder contained in the green body. Therefore, setting the orientation degree of the crystal plane A at a certain value or greater may provide grain oriented ceramics in which the {001} plane of each grain is oriented at an extremely high degree of orientation.

Furthermore, a platelike powder for producing the grain oriented ceramics according to the present invention is composed of $Co(OH)_2$ and constituted of a platelike powder in which the {001} plane has developed. $Co(OH)_2$ allows easy production of a platelike powder in which the {001} plane has preferentially developed. Besides, the {001} plane of $Co(OH)_2$ has excellent lattice matching with the $CoO_2$ layer of the layered cobaltite. Therefore, using such a platelike powder as a reactive template makes it possible to easily produce the grain oriented ceramics according to the present invention.

Moreover, a thermoelectric conversion element according to the present invention is constituted of the grain oriented ceramics according to the present invention as thermoelectric conversion materials. The grain oriented ceramics according to the present invention have a higher figure of merit than a non-oriented sintered body of the same composition. Consequently, the thermoelectric conversion element using such ceramics shows a higher figure of merit than that using the non-oriented sintered body of the same composition.

Additional objects and advantages of the invention are set forth in the following description, are obvious from the description, or may be learned by practicing the invention. The objects and advantages of the invention may be realized and attained by means of instrumentalities and combinations particularly pointed out in the claims.

BRIEF DESCRIPTION OF THE DRAWINGS

The accompanying drawings, which are incorporated in and constitute part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
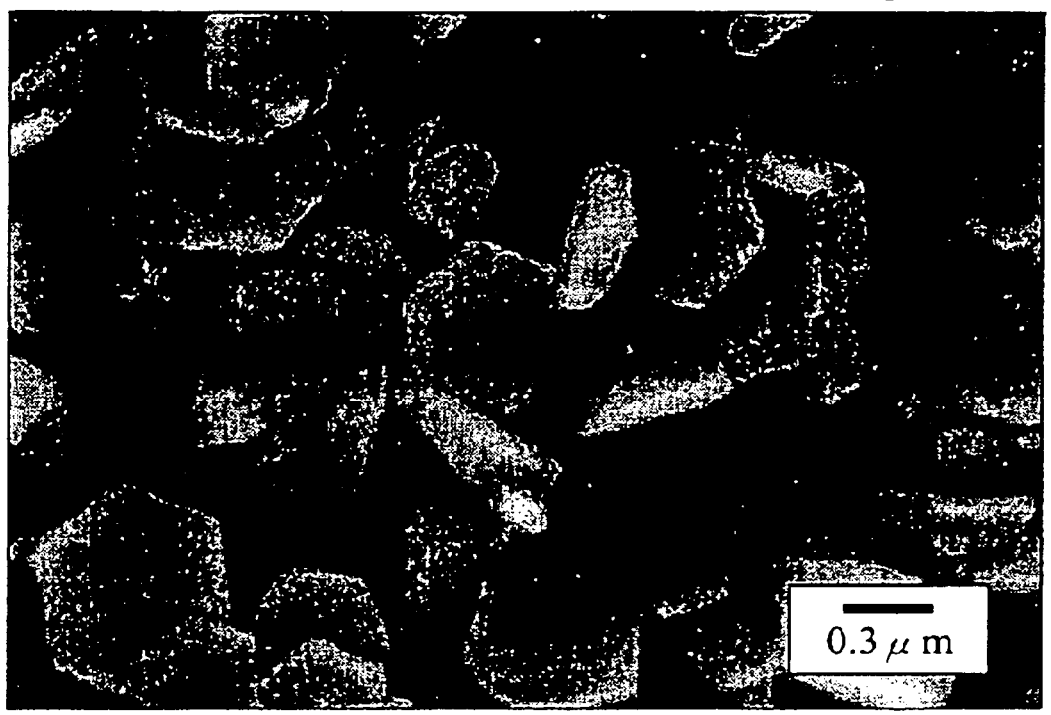
FIG. 1 is a scanning electron microscopic (SEM) image of a $Co(OH)_2$ platelike powder synthesized by the precipitation method.

A detailed description of preferred embodiments embodying the present invention will be given below. Grain oriented ceramics according to the first preferred embodiment of the present invention are constituted of a polycrystalline body of a layered cobaltite. It is characterized in that an average orientation degree of a {001} plane of each grain constituting the polycrystalline body, obtained by the Lotgering's method, is 50% or more.

Although the structure of the "layered cobaltite" has not been elucidated, the layered cobaltite is a layered compound in which a first sublattice constituted of a $CoO_2$ layer and a second sublattice constituted of a layer different from the $CoO_2$ layer are piled in a particular cycle. In other words, the "layered cobaltite" means the layered compound including the $CoO_2$ layer as one of its sublattices.

The first sublattice is constituted of one or more $CoO_2$ layers. In addition, the "$CoO_2$ layer" means that each of $CoO_6$ regular octahedrons has a Co atom in its center and six oxygen atoms in total at its corner, and they two-dimensionally connect to one another as they share an edge.

On the other hand, the second sublattice may be any layer different from the $CoO_2$ layer, and its composition and structure are not particularly limited. That is, the second sublattice may be constituted of one kind of layer or two or more kinds of layers which differs in their composition and sublattice structure and which are piled in an ordered or a disordered way. However, in order to obtain excellent thermoelectric properties, it is particularly preferable that the second sublattice have a rock-salt structure or a distorted rock-salt structure (those are referred to as a "pseudo rock-salt structure layer" in this invention).

Further, the first sublattice and the second sublattice should be piled in alternate order, but their piling cycle is not particularly limited. That is, the layered cobaltite may be constituted of one or more $CoO_2$ layers (the first sublattice) and one or more layers different from those aforementioned (the second sublattice), which have been piled in an ordered or a disordered structure and in a short or long cycle.

Furthermore, in the case where the second sublattice includes Co, other metal elements (e.g. Cu, Sn, Mn, Ni, Fe, Zr, Cr, and the like) may have substituted for part of Co. Also, the metal elements mentioned above may have substituted for part of Co included in the first sublattice.

Specifically, the layered cobaltite may preferably include $Ca_3Co_4O_9$, $Bi_2Ca_2Co_2O_9$, $Bi_2Sr_2Co_2O_9$, $Bi_2Ba_2Co_2O_9$, and the like. Layered oxides in which part of the cation elements constituting the above layered oxides are replaced by other elements may be taken as a preferable example. Among them, a layered cobaltite containing calcium (hereinafter, referred to as a "layered calcium cobaltite"), particularly the layered calcium cobaltite expressed by the following chemical formula 1, has excellent thermoelectric properties. Therefore, if its crystal orientation is directed in one direction, a thermoelectric conversion material having a high figure of merit can be obtained.

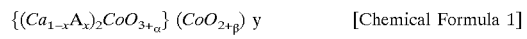   [Chemical Formula 1]

(Where, A is at least one kind of substitute element selected from the group consisting of an alkali metal, an alkaline earth metal, and Bi, $0 \leq x \leq 0.3$,
$0.5 \leq y \leq 2.0$, and
$0.85 \leq \{3+\alpha+(2+\beta)y\}/(3+2y) \leq 1.15$)

It should be noted that "$0.85 \leq \{3+\alpha+(2+\beta)y\}/(3+2y) \leq 1.15$" of the chemical formula 1 indicates that the amount of oxygen may be excessive or deficient within ±15 atm % with respect to a stoichiometric amount of oxygen (3+2y) contained in the layered calcium cobaltite having the fundamental composition of ($\{(Ca_{1-x}A_x)_2CoO_3\}$ $(CoO_2)y$). In this case, the excess or deficiency of oxygen may be either the oxygen ($\beta$) contained in the first sublattice or the oxygen ($\alpha$) contained in the second sublattice, or it may be both of them.

In the layered calcium cobaltite expressed by the chemical formula 1, when the substitute element A constituted of an alkali metal, an alkaline earth metal and/or Bi substitutes for part of Ca, electrical conductivity of the layered oxide can be enhanced. However, when the substitute element A's amount for Ca becomes excessive, the layered calcium cobaltite becomes chemically unstable, e.g., due to a reaction with the water in air in case of an excessive amount of alkali water introduced. Therefore, the substitution amount is preferably 30 atm % or less.

Further, in the layered calcium cobaltite expressed by the chemical formula 1, Cu, Sn, Mn, Ni, Fe, Zr, and/or Cr (hereinafter, these are referred to as a "substitute element C") may substitute for part of Co contained in the first sublattice and/or the second sublattice. This allows a Seebeck coefficient and/or electrical conductivity of the layered oxide to increase. In this case, a substitution amount of the substitute element C for Co is preferably 25 atm % or less.

The second example of the layered cobaltite having excellent thermoelectric properties is expressed by the following chemical formula 2. The layered cobaltite expressed by the chemical formula 2 can be also a thermoelectric conversion material having a high figure of merit by directing their crystal orientation in one direction.

   [Chemical Formula 2]

(Where, B is at least one kind of substitute element selected from the group consisting of an alkali metal and an alkaline earth metal, $0.2 \leq x \leq 0.8$,
$0 \leq y < 0.5$,
$0.2 \leq x+y \leq 1$,
$0.25 \leq z \leq 0.5$, and
$0.85 \leq \{1+\alpha+(2+\beta)z\}/(1+2z) \leq 1.15$)

It should be noted that "$0.85 \leq \{1+\alpha+(2+\beta)z\}/(1+2z) \leq 1.15$" of the chemical formula 2 indicates that the amount of oxygen may be excess or deficient within ±15 atm % with respect to a stoichiometric amount of oxygen (1+2z) contained in the layered cobaltite having the fundamental composition of (($Bi_{1-x-y}B_xCo_yO$) $(CoO_2)_z$). In this case, the excess or deficiency of oxygen may be either the oxygen ($\beta$) contained in the first sublattice or the oxygen ($\alpha$) contained in the second sublattice, or it may be both of them.

Further, in the layered cobaltite expressed by the chemical formula 2, the substitute element C may substitute for part of Co contained in the first sublattice and/or the second sublattice. This allows a Seebeck coefficient and/or electrical conductivity of the layered oxide to increase. In this case, the substitution amount of the substitute element C for Co is preferably 25 atm % or less.

The third example of the layered cobaltite having excellent thermoelectric properties is expressed by the following chemical formula 3. The layered cobaltite expressed by the chemical formula 3 can be also a thermoelectric conversion material having a high figure of merit by directing their crystal orientation in one direction.

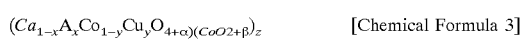   [Chemical Formula 3]

(Where, A is at least one kind of substitute element selected from the group consisting of an alkali metal, an alkaline earth metal, and Bi, $0 \leq x \leq 0.3$,
$0.25 \leq y \leq 0.5$,
$0.6 \leq z \leq 1.0$, and
$0.85 \leq \{4+\alpha+(2+\beta)z\}/(4+2z) \leq 1.15$)

It should be noted that "$0.85 \leq \{4+\alpha+(2+\beta)z\}/(4+2z) \leq 1.15$" of the chemical formula 3 indicates that the amount of oxygen may be excess or deficient within +15 atm % with respect to a stoichiometric amount of oxygen (4+2z) contained in the layered cobaltite having the fundamental composition of ($Ca_{1-x}A_xCo_{1-y}Cu_yO_4$) $(CoO_2)_z$). In this case, the excess or deficiency of oxygen maybe either the oxygen ($\beta$)

contained in the first sublattice or the oxygen (α) contained in the second sublattice, or it may be both of them.

Further, in the layered cobaltite expressed by the chemical formula 3, the substitute element C except Cu may substitute for part of Co contained in the first sublattice and/or the second sublattice. This allows a Seebeck coefficient and/or electrical conductivity of the layered oxide to increase. In this case, the substitution amount of the substitute element C for Co is preferably 15 atm % or less.

In addition, an average orientation degree obtained by the Lotgering's method Q (HKL) is an index indicating the orientation degree of each grain and a value expressed by the following expression 1.

$$Q(HKL) = \frac{\frac{\sum' I(HKL)}{\sum I(hkl)} - \frac{\sum' I_0(HKL)}{\sum I_0(hkl)}}{1 - \frac{\sum' I_0(HKL)}{\sum I_0(hkl)}} \times 100(\%) \quad \text{[Expression 1]}$$

In the expression 1, ΣI(hkl) is a total sum of the X-ray diffraction intensity of all crystal planes (hkl) measured for the grain oriented ceramics, while $\Sigma I_0$(hkl) is the total sum of the X-ray diffraction intensity of all crystal planes (hkl) measured for non-oriented ceramics having the same composition as the grain oriented ceramics. Further, Σ'I (HKL) is a total sum of the X-ray diffraction intensity of specified crystal planes (HKL) being crystallographically equivalent and measured for grain oriented ceramics, and$\Sigma' I_0$ (HKL) is the total sum of the X-ray diffraction intensity of specified crystal planes (HKL) being crystallographically equivalent and measured for non-oriented ceramics having the same composition as the grain oriented ceramics.

Further, in the present invention, to calculate the average orientation degree Q(HKL), a diffraction peak within the range of 2θ=5°–60° obtained when using a Cu-Kα ray as an X-ray source to conduct the X-ray diffraction was employed.

Accordingly, when each grain constituting a polycrystalline body is non-oriented, the average orientation degree Q (HLK) becomes 0%. Further, when the (HKL) planes of all the grains constituting the polycrystalline body is oriented in parallel with the measurement plane, the average orientation degree Q (HLK) becomes 100%.

In the grain oriented ceramics consistent with the present embodiment, the higher the orientation degree of the {001} plane, the higher the figure of merit can be obtained. Specifically, the preferable orientation degree of the {001} plane is 50% or more, and more preferably 80% or more.

Next, the function of the grain oriented ceramics consistent with the present embodiment will be described. The layered cobaltite is a p-type thermoelectric conversion material having a relatively large Seebeck coefficient. Further, the layered cobaltite has a layer structure in which a $CoO_2$ layer with high electrical conductivity and another type of layer are laminated in a predetermined cycle. Add to this, it has been known that lattice misfit exists on an interface between these two layers. It has been considered that anisotropy corresponding to the crystal orientation is observed in the thermoelectric properties of the layered cobaltite for the following reason: The layered cobaltite has a layered crystal structure, and a scattering pattern of carriers and phonons varies depending on the lattice misfit existing on the interface between the $CoO_2$ layer and the other layer.

The grain oriented ceramics consistent with the present embodiment are constituted of the polycrystalline body of the layered cobaltite having such excellent thermoelectric properties. Moreover, each grain constituting the polycrystalline body is oriented at a high orientation degree so that the {001} plane with such excellent thermoelectric properties is oriented in one direction. Therefore, the figure of merit in the direction parallel to the orientation of the {001} plane shows a value higher than the figure of merit of a non-oriented sintered body having the identical composition. Particularly, the grain oriented ceramics constituted of the layered cobaltite expressed by the chemical formulas 1 to 3 show excellent thermoelectric properties. Therefore, a thermoelectric conversion element using this shows a higher figure of merit than the thermoelectric conversion element using the non-oriented sintered body having the identical composition.

Next, grain oriented ceramics according to the second embodiment of the present invention will be described. The grain oriented ceramics consistent with the present embodiment is constituted of a polycrystalline body of the layered cobaltite described above, and a rocking curve full width at half maximum of the {001} plane of the layered cobaltite is 15 degrees or less.

The "rocking curve" indicates a curve which expresses diffraction intensity as a function of rotation angle obtained when a monochromatic X-ray is made to enter a sample from a certain direction, and the sample is made to rotate in the vicinity of the Bragg angle. When the monochromatic X-ray is made to enter a certain plane (measurement plane) of the polycrystalline body, and the rocking curve of an X-ray diffraction peak corresponding to a specified crystal plane is measured, the orientation degree of the specified crystal plane with respect to the measurement plane can be obtained. Generally, a narrower rocking curve full width at half maximum indicates a higher orientation degree of the specified crystal plane with respect to the measurement plane.

In addition to the rocking curve full width at half maximum which is the index indicating the orientation degree of the specified crystal plane of each grain constituting the polycrystalline body, for example, the average orientation degree by the Lotgering's method Q (HKL) mentioned above has been known. The average orientation degree by the Lotgering's method Q (HKL) is suitable as an index indicating the orientation degree in the region from the middle to high orientation degrees. On the other hand, the rocking curve full width at half maximum is suitable as an index indicating in detail the orientation degree in the high orientation degree region which can be hardly distinguished by the average orientation degree by the Lotgering's method Q (HKL).

In the grain oriented ceramics according to the present embodiment, in order to obtain excellent thermoelectric properties, it is preferable that a rocking curve full width at half maximum of the {001} plane of the layered cobaltite measured with respect to the orientation plane be smaller. Specifically, the rocking curve full width at half maximum of the {001} plane is preferably 15 degrees or less, more preferably 12 degrees or less.

Further, more than one X-ray diffraction peak with respect to the {001} plane usually appears. An optimum peak used for measuring the rocking curve full width at half maximum is selected from them in accordance with the composition of the layered cobaltite, the crystal structure, and the like. Generally, it is acceptable if at least the rocking curve full width at half maximum measured using the highest peak of the {001} plane falls within the above range. Furthermore, in the case where more than one peak of the {001} plane being relatively high exists, it is acceptable if at least the rocking curve full width at half maximum measured using the peak of the {001} plane at the high angle side falls within the above range.

For example, in the case of the layered cobaltite expressed by the chemical formula 1, the X-ray diffraction peak of the (004) plane is used. On the other hand, in the case of the layered cobaltite expressed by the chemical formula 2, the X-ray diffraction peak of the (0010) plane is used.

It should be noted that, as is the case of the grain oriented ceramics consistent with the first embodiment, the layered cobaltite in this embodiment preferably has a structure in which the first sublattice constituted of the $CoO_2$ layer and the second sublattice constituted of the pseudo rock-salt structure layer are piled in alternate order, particularly the structures expressed by the chemical formulas 1 to 3. Further, other respects of the grain oriented ceramics consistent with the present embodiment will not be described since they are the same as those of the grain oriented ceramics of the first embodiment.

Next, the function of the grain oriented ceramics according to the present embodiment will be described. It has been known that when a certain crystal orientation is given in a material having anisotropy corresponding to crystal orientation with respect to a certain property such as a piezoelectric constant, the property in an orientation direction are enhanced. In this case, as the orientation degree gets higher, the property is enhanced, but when the orientation degree exceeds a certain value, the property usually becomes saturated and will not be enhanced anymore.

However, in the case of an oriented sintered body constituted of the layered cobaltite, its thermoelectric properties do not become saturated in the high orientation degree region which is hardly distinguished by the orientation degree by the Lotgering's method (specifically, the region in which the average orientation degree of the {001} plane by the Lotgering's method is 99% or more), and a slight change in the orientation degree brings about a great change in the thermoelectric properties. It has been considered that this great change therein occurs because electrical conductivity σ in the orientation direction greatly changes due to the slight change in the orientation degree.

The grain oriented ceramics consistent with the present embodiment is constituted of the polycrystalline body of the layered cobaltite having excellent thermoelectric properties, and the orientation degree of the {001} plane is extremely high. Therefore, the grain oriented ceramics of the present embodiment shows thermoelectric properties better than the non-oriented ceramics and poorly-oriented ceramics having the same composition as the grain oriented ceramics. Further, a thermoelectric conversion element employing the grain oriented ceramics consistent with the present embodiment shows a figure of merit higher than a thermoelectric conversion element employing the non-oriented ceramics and poorly-oriented ceramics having the same composition as the grain oriented ceramics.

Next, platelike powder for producing the grain oriented ceramics according to the present invention will be described. The ceramics having complicated composition such as the layered cobaltite are usually produced under the following process: Simple compounds containing ingredient elements are blended to have a stoichiometric ratio; this mixture is molded, calcinated, and ground; then, the ground powder is remolded and sintered. Under this process, however, it is extremely difficult to obtain the oriented sintered body in which a specific crystal plane of each grain is oriented in a specific direction.

In the present invention, in order to solve the above problem, an anisotropically-shaped powder being platelike, needlelike, and others satisfying a specific condition are oriented in a green body. Then, this anisotropically-shaped powder is used as a template or a reactive template for synthesizing and sintering a layered cobaltite, whereby the {001} plane of each grain constituting the polycrystalline body is oriented in one direction. The present invention employs the anisotropically-shaped powder satisfying the conditions mentioned below.

First of all, the anisotropically-shaped powder should have a shape appropriate for easy orientation in one direction at the time of molding. For the easy orientation, it is preferable that an average aspect ratio of the anisotropically-shaped powder (=an average value of the largest dimension/the smallest dimension of the anisotropically-shaped powder) be 3 or higher. If the average aspect ratio is lower than 3, it will become difficult to orient the anisotropically-shaped powder in one direction at the time of molding. More preferably, the average aspect ratio of the anisotropically-shaped powder is 5 or higher.

In general, the orientation of the anisotropically-shaped powder shows a tendency to be carried out more easily when the average aspect ratio of the anisotropically-shaped powder becomes higher. However, when the average aspect ratio becomes too high, the anisotropically-shaped powder would be pulverized in a material preparation step which will be described below, and the green body in which the anisotropically-shaped powder is oriented may not be obtained. Accordingly, the average aspect ratio of the anisotropically-shaped powder is preferably 100 or lower, and more preferably 20 or lower.

In addition, it is preferable that an average grain size of the anisotropically-shaped powder (=an average value of the largest size of the anisotropically-shaped powder) be 0.05 μm or lager and 20, μm or smaller. When the average grain size of the anisotropically-shaped powder is smaller than 0.05 μm, it becomes difficult to orient the anisotropically-shaped powder in one direction under shearing stress given during molding. On the other hand, when the average grain size of the anisotropically-shaped powder exceeds 20 μm, sinterbility becomes lower. It is more preferable that the average grain size of the anisotropically-shaped powder be 0.1 μm or larger and 5 μm or smaller.

Second, for the anisotropically-shaped powder, such is used that its developed plane (the plane having the largest area) is the crystal plane having lattice matching with a $CoO_2$ layer of the layered cobaltite (hereinafter, referred to as a "crystal plane A"). In the case where the anisotropically-shaped powder has a predetermined shape, but when their developed plane does not have the lattice matching with the $CoO_2$ layer of the layered cobaltite, it is not preferable to use the anisotropically-shaped powder since they may not function as the template for producing the grain oriented ceramics consistent with the present invention.

The adequacy of the lattice matching can be expressed by a value obtained by dividing an absolute value of the difference between the lattice size of the developed plane of the anisotropically-shaped powder and the lattice size of the $CoO_2$ layer of the layered cobaltite by the lattice size of the developed plane of the anisotropically-shaped powder (hereinafter, referred to as a "lattice matching ratio"). This lattice matching ratio may slightly vary depending on a direction of a lattice which is used for calculation of the lattice matching ratio. Generally, the lower an average lattice matching ratio, the better the anisotropically-shaped powder functions as the template. In order to produce the grain oriented ceramics having a high orientation degree, the average lattice matching ratio of the anisotropically-shaped powder is preferably 20% or lower, more preferably 10% or lower.

Third, the anisotropically-shaped powder is not necessarily the layered cobaltite itself, and such may be used that the anisotropically-shaped powder reacts with the second powder which will be described below to form the layered cobaltite (hereinafter, referred to as a "precursor of the layered cobaltite") Accordingly, id the anisotropically-shaped powder is to be selected from compounds or solid solutions including any one or more cation elements contained in the layered cobaltite.

Any anisotropically-shaped powder satisfying the above conditions will function as the template or the reaction template for producing the grain oriented ceramics consistent with the present invention. Specifically, layered cobaltites having the same composition as the grain oriented ceramics to be produced or cobalt compounds, such as $Co(OH)_2$, $CoO$, $Co_3O_4$, and $CoO(OH)$, may be preferable as the materials satisfying these conditions. By using any materials mentioned above, a platelike powder having the crystal plane A as its developed plane can be synthesized relatively easily.

The platelike powder of the layered cobaltite having the $\{001\}$ plane as its developed plane certainly functions as the template for producing the grain oriented ceramics according to the present invention. This kind of platelike powder can be synthesized by a method related to a liquid phase such as the precipitation method by which salt having the constituent element of the platelike powder to be synthesized is dissolved in water, and an alkali aqueous solution (e.g. NaOH, KOH, and ammonia) is dropped in the above solution, the flux method by which an oxide containing the constituent element is heated in a flux, and the hydrothermal method by which an oxide containing the constituent element is heated in an autoclave. In addition, at this point, if synthesis conditions are appropriately controlled, a shape of the platelike powder can be also controlled relatively easily.

$Co(OH)_2$ has a $CdI_2$-type crystal structure. Since the surface energy on a $\{001\}$ plane of $Co(OH)_2$ is smaller than that of other crystal planes, it is relatively easy to produce the platelike powder having the $\{001\}$ plane as its developed plane. Further, the $\{001\}$ plane of $Co(OH)_2$ has excellent lattice matching with the $CoO_2$ layer of the layered cobaltite. Thus, the $Co(OH)_2$ platelike powder having the $\{001\}$ plane as its developed plane is particularly preferable as the reactive template for producing the grain oriented ceramics according to the present invention.

The $Co(OH)_2$ platelike powder having the $\{001\}$ plane as its developed plane can be synthesized by the precipitation method. Specifically, an alkaline aqueous solution (NaOH, KOH, an ammonia solution, and the like) may be dropped into an aqueous solution containing cobalt salt such as $CoCl_2$ and $Co(NO_3)_2$, while $N_2$ bubbling is performed. This allows the $Co(OH)_2$ platelike powder with developed $\{001\}$ plane preferred to be deposited. Also, at this stage, if synthesis conditions are controlled as needed, the shape of the platelike powder can be also controlled relatively easily.

In addition, $CoO$ has a rock-salt crystal structure, and its $\{111\}$ plane have excellent lattice matching with the $CoO_2$ layer of the layered cobaltite. Therefore, the $CoO$ platelike powder having the $\{111\}$ plane as its developed plane is preferable as the reactive template for producing the grain oriented ceramics according to the present invention.

Furthermore, $Co_3O_4$ has a spinel-type crystal structure, and its $\{111\}$ plane has excellent lattice matching with the $CoO_2$ layer of the layered cobaltite. Therefore, the $Co_3O_4$ platelike powder having the $\{111\}$ plane as its developed plane is preferable as the reactive template for producing the grain oriented ceramics according to the present invention.

Further, the $\{001\}$ plane of COO(OH) has excellent lattice matching with the $CoO_2$ layer of the layered cobaltite. Therefore, The COO(OH) platelike powder having the $\{001\}$ plane as its developed plane is preferable as the reactive template for producing the grain oriented ceramics consistent with the present invention.

The $CoO$ platelike powder, the $Co_3O_4$ platelike powder, and the $CoO(OH)$ platelike powder having specified planes as their developed planes can be synthesized under a method of aging an aqueous solution containing the $Co(OH)_2$ platelike powder for a predetermined time in an oxidizing atmosphere, a method of bubbling oxidizing gas such as oxygen, ozone, and the like in an aqueous solution containing the $Co(OH)_2$ platelike powder, and a method of bubbling oxidizing gas such as oxygen, ozone, and the like in an aqueous solution when precipitation is obtained from the aqueous solution containing cobalt salt under the precipitation method.

Next, the process for producing the grain oriented ceramics consistent with the present embodiment will be described. The process includes a material preparation step, a molding step, and a sintering step.

First, the material preparation step will be described. In this step, a material including the first powder with the "crystal plane A" having lattice matching with the $CoO_2$ layer of the layered cobaltite mentioned above is prepared. In the present embodiment, the anisotropically-shaped powder of which developed plane is the crystal plane A is used as the first powder. Particularly, it is preferable that the first powder be the platelike powder of which developed plane is the crystal plane A. Further, the first powder may be constituted of the layered cobaltite or the precursor thereof.

Moreover, the first powder may be constituted of one kind of compound, or it may be a mixture of two or more kinds of compounds.

Also, in the case where the first powder is a precursor of the layered cobaltite, the first and second powders are blended at a predetermined ratio. The "second powder" means a compound which reacts with the fist powder as the precursor to form a layered cobaltite. The composition and the blending ratio of the second powder are determined according to the composition of the layered cobaltite to be synthesized and the composition of the first powder to be used as the reactive template. Further, the form of the second powder is not particularly limited, and the following materials may be included: a hydroxide, an oxide powder, a complex oxide powder, salt including a carbonate, a nitrate, an oxalate, an acetate, and an alkoxide.

For example, when the layered cobaltite is the layered calcium cobaltite (e.g. $Ca_3Co_4O_9$) expressed by the chemical formula 1, and when the platelike powder constituted of $Co(OH)_2$, CoO, $Co_3O_4$, and/or CoO (OH) is used as the first powder, as the second powder, a second compound containing an alkaline earth metal element such as Ca may be used. Further, in the case where the layered cobaltite contains a third element except an alkaline earth metal element and Co (in this case, containing at least one kind of alkali metal element and/or Bi), the third compound containing them is used as the second powder.

The second compound which can form an oxide of an alkaline earth metal element by firing may be used, and it can be various compounds including an oxide, a hydroxide, salt, and an alkoxide, which contain an alkaline earth metal element.

Specifically, the following second compounds containing Ca may be taken as favorable examples: a calcium oxide (CaO), a calcium hydroxide (Ca(OH)), a calcium chloride ($CaCl_2$), a calcium carbonate ($CaCO_3$), a calcium nitrate (Ca $(NO_3)_2$), a calcium dimethoxide (Ca $(OCH_3)_2$), a calcium diethoxide ($Ca(OC_2H_5)_2$), and a calcium di-isopropoxide ($Ca(OC_3H_7)_2$). Furthermore, the second compound may be only one of the above-mentioned compounds, but it may be two or more of the above in combination.

When a second compound is solid, or when a solid second compound is mixed as it is, the average grain size of the second compound is preferably 10 $\mu$m or smaller. When the average grain size exceeds 10 $\mu$m, reaction may be inhomogenous, and/or sinterbility decreases, thereby giving an unfavorable result. The average grain size of the second compound is more preferably 5 $\mu$m or smaller. A smaller average grain size is better as long as moldability and handleability do not decrease.

The third compound which can form an oxide containing a third element by firing may be used, and it can be various compounds including an oxide, a hydroxide, salt, and an alkoxide, which contain the third element.

The following third compounds containing only Na may be specifically taken as favorable examples: a sodium carbonate ($Na_2CO_3$), a sodium nitrate ($NaNO_3$), and a sodium isopropoxide ($Na(OC_3H_7)$)

The following third compounds containing only K may be specifically taken as favorable examples: a potassium carbonate ($K_2CO_3$), a potassium acetate ($CH_3$ COOK), a potassium nitrate ($KNO_3$), and a potassium isopropoxide ($K(OC_3H_7)$)

The following third compounds containing only Bi may be specifically taken as favorable examples: a bismuth oxide ($Bi_2O_3$), a bismuth nitrate ($Bi(NO_3)_3$), a bismuth chloride ($BiCl_3$), a bismuth hydroxide ($Bi(OH)_3$), a bismuth tri-isopropoxide ($Bi(OC_3H_7)_3$), and a Bi metal.

In addition, the third compound may be a complex compound containing two or more kinds of third elements. Moreover, as the second powder, only one of the above-mentioned third compounds may be used, or two or more of the above may be used in combination.

Incidentally, when the third compound is solid, or when a solid third compound is used as it is, the average grain size of the third compound is preferably 10 $\mu$m or smaller, and more preferably 5 $\mu$m or smaller, as is the case of the second compound.

Further, for example, in the case where the layered cobaltite is expressed by the chemical formula 1 and is the layered calcium cobaltite in which the substitute element C has substituted for part of Co, and where the platelike powder constituted of $Co(OH)_2$, CoO, $CO_3O_4$, and/or CoO (OH) is used as the first powder, at least one kind of fourth compound containing the substitute element C may be used as the second powder in addition to the above-mentioned second and third compounds.

The fourth compound which can form an oxide containing the substitute element C by firing may be used, and it can be various compounds including an oxide, a hydroxide, salt, and an alkoxide, which contain the substitute element C. Specifically, the following fourth compounds containing Cu may be taken as favorable examples: a copper oxide (CuO, $Cu_2O$), a copper carbonate ($CuCO_3$), a copper chloride (CuCl, $CuCl_2$), and a Cu metal alone. Furthermore, the fourth compound may be only one of the above-mentioned compounds, but it may be two or more of the above in combination.

Incidentally, when a fourth compound is solid, or when a solid fourth compound is mixed as it is, the average grain size of the fourth compound is preferably 10 $\mu$m or smaller, and more preferably 5 $\mu$m or smaller, as in the cases of the second and third compounds.

Further, the production process consistent with the present invention can be applied to not only a layered calcium cobaltite but also layered cobaltites considered to have a $CoO_2$ layer as a sublattice. For example, in the case where a layered cobaltite has composition expressed by the chemical formula 2 (e.g. $Bi_2Sr_2Co_2O_9$, and $Bi_2Ba_2Co_2O_9$), and where the platelike powder constituted of $Co(OH)_2$, CoO, $Co_3O_4$, and/or CoO (OH) is used as the first powder, at least one kind of second compound containing an alkaline earth metal element, at least one kind of third compound containing Bi, and at least one kind of third compound containing an alkali metal are used as the second powder.

Moreover, in the case where a layered cobaltite is expressed by the chemical formula 2, where the substitute element C has substituted for part of Co, and where the platelike powder constituted of Co(OH)2, CoO, $Co_3O_4$, and/or CoO (OH) are used as the first powder, at least one kind of fourth compound containing the substitute element C may be used as the second powder in addition to the second and third compounds mentioned above. Grain oriented ceramics constituted of a layered cobaltite having other compositions are also produced in the same manner.

In the material preparation step, a fine powder (hereinafter, referred to as the "third powder") having the same composition as the layered cobaltite to be produced may be further added to the first powder and the second powder blended at a predetermined ratio. When the third powder is added to the material, a sintered density can be enhanced.

When the blending ratio of the third powder becomes excessive, the blending ratio of the first powder in the whole material inevitably decreases, whereby the orientation degree of the {001} plane of the grain oriented ceramics may possibly decrease. Accordingly, an optimum blending ratio of the third powder is preferably determined so that a desired orientation degree of the {001} plane can be obtained.

Further, adding the second powder and/or the third powder to the first powder to be mixed together may be carried out under the dry process. Otherwise, it may be carried out under the wet process by adding a dispersion medium such as water and alcohol. Moreover, at this point, a binder and/or a plasticizer may be added as necessary.

Next, the molding step will be described. In this step, the material obtained in the material preparation step is molded so that the crystal plane A is oriented. Here, "the crystal plane A is oriented" means that the crystal plane A (i.e. the developed plane of the anisotropically-shaped powder) is arranged in parallel to one another (hereinafter, referred to as "plane-oriented"), or that the crystal plane A is arranged in parallel to one axis passing through the green body (hereinafter, referred to as "axis-oriented"). In order to obtain excellent thermoelectric properties, it is preferable that the crystal plane A be plane-oriented.

Further, in the case where the crystal plane A is made to be plane-oriented, the material is preferably molded so that the average orientation degree of the crystal plane A by the Lotgering's method has a predetermined value or greater. A greater orientation degree of the crystal plane A of the first powder contained in the green body is preferable in order to obtain the grain oriented ceramics having excellent thermoelectric properties. The average orientation degree of the crystal plane A by the Lotgering's method is preferably 55% or more, more preferably 70% or more, and further preferably 80% or more.

It should be noted that in the case where the crystal plane A is made to be axis-oriented, the degree of orientation cannot be defined by the same orientation degree as that of the plane orientation (by the formula of expression 1). However, the degree of the axis orientation can be expressed using an average orientation degree obtained by the Lotgering's method for the (HKL) diffraction in the case where X-ray diffraction is performed on the plane perpendicular to the orientation axis (hereinafter, referred to as an "axis orientation degree"). In the case of the green body in which the crystal plane A are axially oriented, the axis orientation degree will be a negative value. Also, in the case of the green body in which the crystal plane A is axially oriented almost completely, the axis orientation degree will be equivalent to the axis orientation degree measured for the green body in which the crystal plane A is plane-oriented almost completely.

The molding method is not particularly limited, and any methods by which the crystal plane A can be oriented may be employed as the molding method. As the molding method by which the crystal plane A is plane-oriented, the following methods are specifically taken as favorable examples: the doctor blade method, the uniaxial-pressure molding method, the roll-pressing method, and the extrusion method (in a tape form). Further, as the method for axially orienting the crystal plane A, the extrusion is molding method (in a non-tape form) may be a preferable example.

In the case where the anisotropically-shaped powder having the crystal plane A as its developed plane is used as the first powder, the method for obtaining the green body of which crystal plane A is oriented at a high degree specifically includes the following methods.

First, the above green body may be obtained under the method by which the material obtained in the material preparation step is directly roll-pressed. In this case, the orientation degree of the crystal plane A can be controlled by optimizing roll-pressing conditions such as a roll-pressing temperature or a thickness reduction ratio. In general, as the roll-pressing temperature gets higher, and/or as the thickness reduction ratio gets higher, the orientation degree of the crystal plane A can be high. Incidentally, the thickness reduction ratio is a value defined by the following formula:

Thickness reduction ratio={(a thickness of a sheet before roll-pressing—a thickness of the sheet after roll-pressing)/the thickness of the sheet before roll-pressing} X 100 (%)

Second, the above green body may be obtained under the method by which the green body is produced by applying strong shear stress to the first powder, and the obtained green body is roll-pressed. Particularly, such is preferable that the green body be produced in a tape shape by the doctor blade method or the extrusion method, and it be directly roll-pressed, or a predetermined number of the tapes be laminated and pressure-bonded to be roll-pressed. Under the doctor blade method or the extrusion method, the tape in which the crystal plane A is oriented in parallel with the tape plane can be obtained since relatively strong shear stress is applied to the first powder. When this tape is further roll-pressed, the orientation degree of the crystal plane A can be further improved.

In this case, also, the orientation degree of the crystal plane A can be controlled by optimizing roll-pressing conditions such as the roll-pressing temperature or the thickness reduction ratio. For example, in the case of roll-pressing the laminated body of the tapes obtained by the doctor blade method, the thickness reduction ratio is preferably 10% or more, and more preferably 30% or more. Further, when the green body is roll-pressed at the thickness reduction ratio exceeding 50%, it becomes thin. In this case, it is preferable to prepare a thick green body in expectation of a decrease in the thickness, or to repeat the process of stacking, pressure-bonding, and roll-pressing over the predetermined number of times.

Roll-pressing may be carried out at room temperature, or in the warm below the temperature at which decomposition and deterioration of the binder and the like do not occur. In this case, a roller or rollers may be heated up, or the green body may be heated in advance. Otherwise, both may be heated. Even in the case of roll-pressing at room temperature, the orientation degree of the crystal plane A can be increased. However, in the case of roll-pressing in the warm, the orientation of the crystal plane A can be facilitated because the binder is softened. Generally, when the thickness reduction ratio is stable, as the rolling temperature gets higher, a chance of running a crack in the tape or the laminated body of the tapes is reduced. In the case of roll-pressing in the warm, an optimum rolling temperature varies depending on the kind of binder, but 40° C. or higher is usually preferable, and 60° C. or higher is more preferable.

Next, the sintering step will be described. In this step, the green body obtained in the molding step is heated and sintered. When the green body including the first powder and the second and/or third powders added on an as-needed basis is heated to a predetermined temperature, the layered cobaltite develops and/or is formed due to their reactions, and sintering of the layered cobaltite simultaneously proceeds.

In the case of the layered cobaltite, sintering is usually carried out at 800° C. or higher and 1200° C. or lower. An optimum heating temperature may be determined according to the composition of the first, second, and third powders to be used and the composition of the grain oriented ceramics to be produced so that reactions and sintering can efficiently proceed, and so that undesired phases cannot be formed. For example, in the case where grain oriented ceramics having the $Ca_3Co_4O_9$ composition are produced from the $Co(OH)_2$ platelike powder and $CaCO_3$, the heating temperature is preferably 930° C. or lower at which no different phases are formed. Also, an optimum heating time may be determined so that a predetermined sintered density can be obtained.

The heating method includes a method for gradually increasing from room temperature to a predetermined temperature, and a method for placing an oriented green body in a furnace having been heated at a predetermined temperature in advance in order to immediately heat the body up. An optimum method may be chosen based on the composition of the grain oriented ceramics to be produced. In addition, it may be possible to carry out normal sintering or pressure such as hot pressing, hot forging, and hot-isostatic pressing (HIP).

Furthermore, the sintering step is preferably carried out in an atmosphere with oxygen (i.e. in air or oxygen). When the green body is heated in the atmosphere with no oxygen, an amount of oxygen in the layered cobaltite will decrease, and the thermoelectric properties may be deteriorated. Heating the green body in oxygen is particularly preferable to obtain the grain oriented ceramics having excellent thermoelectric properties.

In the case of the green body including a binder, prior to the sintering step, a heat treatment mainly aiming for degreasing may be given. In this case, the temperature for degreasing is not particularly limited, but the temperature should be high enough to thermally decompose the binder. Incidentally, in the case of using a compound containing a low-melting metal such as Na as a starting material, degreasing is carried out preferably at 500° C. or lower to prevent Na and the like from vaporizing. Further, degreasing is carried out preferably in an atmosphere with oxygen.

Also, when the oriented green body is dewaxed, the orientation degree of the crystal plane A in the oriented green body may decrease, or the oriented green body may expand as reactions proceed. In this case, after degreasing and before sintering, it is preferable that the cold isostatic pressing (CIP) be further carried out on the oriented green body. Conducting the CIP further on the green body having been dewaxed is advantageous because it suppresses a decrease in the orientation degree incident to degreasing or a decrease in the sintered density attributed to a decrease in the oriented green density.

Next, the function the production process of the grain oriented ceramics consistent with the present embodiment will be described. In the case of preparing the material including the first powder and the second and/or third powders added on an as-needed basis and molding it using a molding method under which the first powder is put under shearing stress, the crystal plane A is oriented in the green body. When such an oriented green body is heated at a predetermined temperature, the first, second, and third powders react so that a layered cobaltite develops and/or is formed.

Since the crystal plane A has lattice matching with the $CoO_2$ layer of the layered cobaltite at this stage, the crystal plane A is succeeded to as the {001} plane of the layered cobaltite. As a result, in the sintered body, a platelike grain of the layered cobaltite develops as the {001} plane is oriented in one direction, thereby obtaining the grain oriented ceramics in which the orientation degree of the {001} plane of each grain is high.

Further, the orientation degree of the {001} plane (particularly, the orientation degree of the {001} plane in the high orientation degree region) of the layered cobaltite in the sintered body obtained by such a process heavily depends on the orientation degree of the crystal plane A of the first powder included in the green body. Therefore, the green body in which the orientation degree of the crystal plane A has a predetermined value or greater is produced by giving shear stress to the first powder having an anisotropic shape. When this green body is sintered, it is possible to obtain the grain oriented ceramics in which the {001} plane of each grain is oriented at an extremely high degree.

The production process consistent with the present embodiment is cost-effective since the process can employ an ordinary ceramic production process as it is. In addition, it is possible to obtain grain oriented ceramics in which not only the orientation degree of the {001} plane is high, but also the orientation degree and the composition are uniform, and further of which cross-sectional area is large. Moreover, since the grain oriented ceramics obtained by this process are a polycrystalline body, their fracture toughness is higher than that of a single crystal. Furthermore, since phonons scatter at grain boundaries and vacancies, the thermal conductivity of the present ceramics is lower than that of a single crystal. Moreover, since the {001} plane having high electrical conductivity is oriented at a high degree, the grain oriented ceramics produced by this process offer electrical conductivity higher than that of non-oriented ceramics. Accordingly, if this is used as a thermoelectric conversion material, it is possible to produce a thermoelectric conversion element having excellent durability and thermoelectric properties.

Next, the production process of the grain oriented ceramics according to the second embodiment of the present invention will be described. As the molding method, the production process consistent with the present embodiment employs the magnetic field molding method by which the material containing the first powder is molded in large magnetic fields.

In this case, the first powder may be the layered cobaltite having the same composition as the grain oriented ceramics to be produced, or may be a precursor of the layered cobaltite.

Further, it will be acceptable if the first powder includes the crystal plane A having lattice matching with the $CoO_2$ layer of the layered cobaltite. Also, in order to facilitate the orientation of the crystal plane A, the first powder is preferably the anisotropically-shaped powder of which crystal plane A is the developed plane. Particularly, the platelike powder constituted of the layered cobaltite described above or the cobalt compound, such as $Co(OH)_2$ or the like, is preferable as the first powder. It should be noted that other respects about this embodiment is the same as the first embodiment, and the description is omitted.

In the case of molding the material containing the first powder while applying high magnetic fields to it, the oriented green body in which the orientation degree of the crystal plane A has a predetermined value or greater can be obtained by optimizing the combination of the magnetic fields. When such a green body is heated to a predetermined temperature, the platelike grain of the layered cobaltite develops and/or is formed in parallel with the oriented crystal plane A. As a result, the grain-oriented ceramics in which the {001} plane is oriented at an extremely high degree can be obtained.

According to the production process consistent with the present embodiment, it is possible to cost-effectively obtain the grain-oriented ceramics in which the orientation degree of the {001} plane is extremely high, the orientation degree and the composition are uniform, and of which cross-sectional area is relatively large. In addition, if this is used as a thermoelectric conversion material, it is possible to produce a thermoelectric conversion element having excellent durability and thermoelectric properties.

EXAMPLE 1

$Co(OH)_2$ platelike powder was synthesized through the following steps. First, a $CoCl_2$ aqueous solution of 0.1 mol/l concentration and a NaOH aqueous solution of 0.4 mol/l concentration were prepared. Next, 300 ml of the NaOH aqueous solution was dropped into 600 ml of the $CoCl_2$ aqueous solution at a rate of 100 ml/h. This produced a blue precipitate ($Co(OH)_2$) in the solution.

After the dropping of the NaOH aqueous solution completed, the solution was stirred through $N_2$ bubbling, and was aged at room temperature for 24 hours to obtain a pink crystal (Co $(OH)_2$). The crystal thus obtained was sucked and filtered, and then it was dried by $N_2$ gas for 24 hours at room temperature. FIG. 1 is an SEM image of the powder thus obtained. The $Co(OH)_2$ powder obtained in this example were platelike with a hexagonal shape. The platelike powder had an average size of 0.5 μm and an average aspect ratio of approximately 5.

EXAMPLE 2

Figure 2:
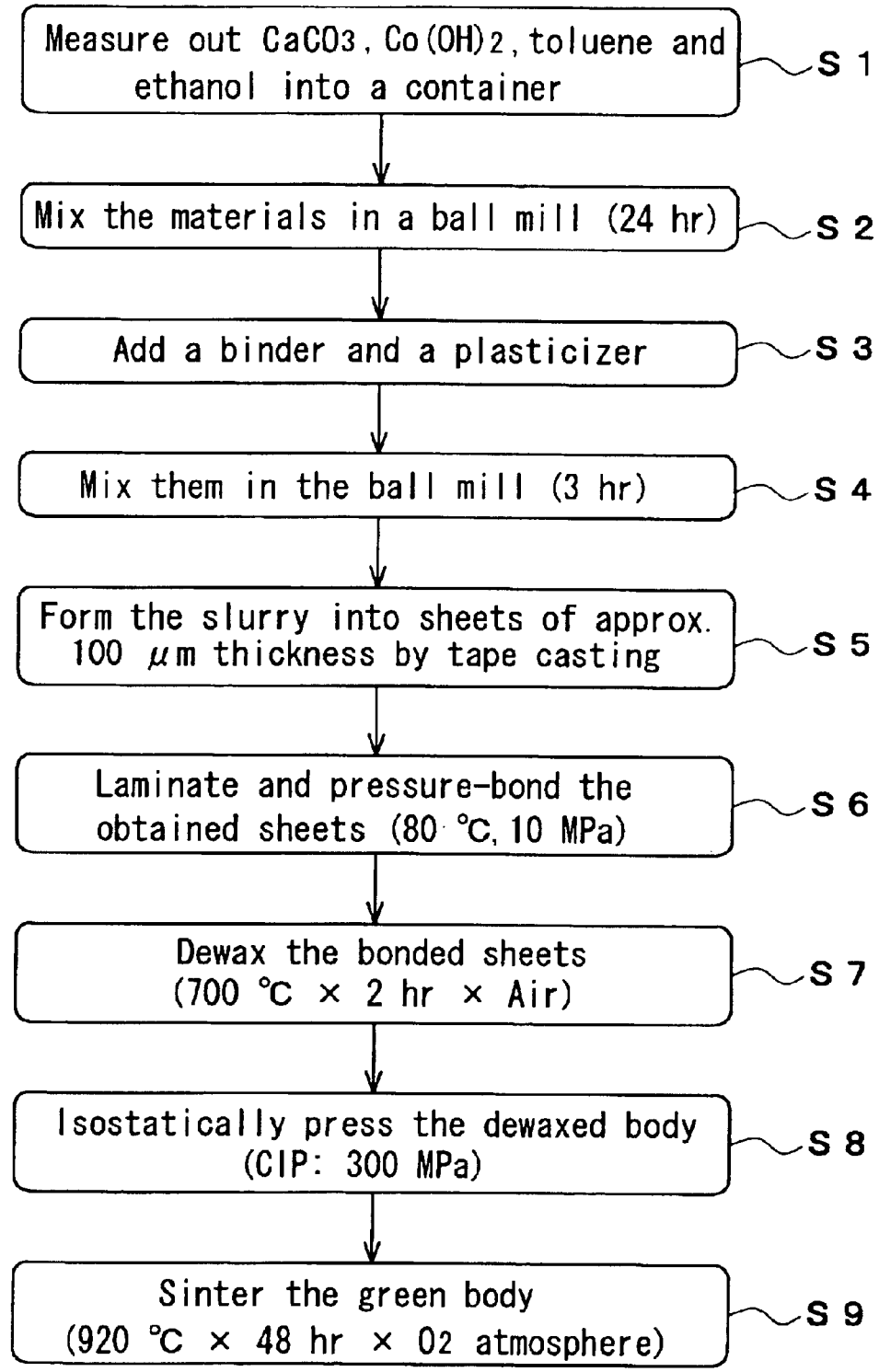
FIG. 2 is a flow chart showing a production process of grain oriented ceramics according to the first embodiment of the present invention.

Grain oriented ceramics composed of $Ca_3Co_4O_9$ were prepared through the steps shown in FIG. 2. First, in Step 1 (hereinafter abbreviated simply as "S1"), predetermined amounts of a $CaCO_3$ powder (average grain size: 0.2 μm), the $Co(OH)_2$ platelike powder synthesized in Example 1, toluene and anhydrous ethanol were measured out into a container. Subsequently, these materials were put into a ball mill and wet-mixed for 24 hours (S2). After completion of the mixing, predetermined amounts of a binder and a plasticizer were added to the slurry (S3), and they were wet-mixed in the ball mill for another three hours (S4). Table 1 shows the amounts of those materials to be charged for the mixing.

TABLE 1

| Charging Amount | |
| --- | --- |
| $CaCo_3$ | 21.00 g |
| $Co(OH)_2$[1] | 26.04 g |
| Toluene | 60 ml |
| Anhydrous Ethanol | 40 ml |
| Binder[2] | 4 g |
| Plasticizer[3] | 4 g |

[1] platelike crystal (grain size: 0.5 μm)
[2] polyvinyl butyral
[3] butyl phthalate Next, the slurry was taken out of the pot, and was molded into 100 μm-thick sheets by tape casting (S5). The obtained sheets were laminated and pressure-bonded under the conditions at a temperature of 80° C. and at a pressure of 10 MPa (S6)

Next, the green body thus obtained was dewaxed in air under the conditions at a temperature of 700° C. and for a heating time of two hours (S7). Subsequently, the green body having been dewaxed was subjected to a CTP treatment (cold isostatic pressing) under the condition at a pressure of 300 MPa (S8). Further, the green body was sintered in oxygen under the conditions at a temperature of 920° C for 48 hours.

EXAMPLE 3

First, the same steps as in Example 2 (Si to S7 in FIG. 2) were performed to prepare a green body in which a $Co(OH)_2$ platelike powder was plane-oriented, and the green body was then dewaxed. Next, the dewaxed body was put in a furnace without being subjected to cold isostatic pressing, and it was hot-pressed in oxygen. The pressure sintering was conducted under the conditions at a pressure of 2 MPa, at a heating temperature of 920° C. and for 48 hours. In addition, the pressure was applied in a direction perpendicular to a tape plane.

EXAMPLE 4

Grain oriented ceramics composed of $\{Ca_{0.95}Na_{0.05}\}_3Co_4O_9$ was prepared through the same steps as in Example 3, except that a $CaCO_3$ powder and a $Na_2CO_3$ powder (average grain size: 0.2 μm) were used as the second powders and that they were mixed such that Na would substitute for 5 atm % of Ca.

EXAMPLE 5

Grain oriented ceramics composed of $\{Ca_{0.9}Na_{0.1}\}_3Co_4O_9$ was prepared through the same steps as in Example 3, except that a $CaCO_3$ powder and a $Na_2CO_3$ powder (average grain size: 0.2 μm) were used as the second powders and that they were mixed such that Na would substitute for 10 atm % of Ca.

Comparative Example 1

First, the same steps as in Example 2 (S1 to S7 in FIG. 2) were performed to prepare a green body in which a $Co(OH)_2$ platelike powder was plane-oriented, and the green body was then dewaxed. Next, the dewaxed body was ground, and the ground powder was then premolded in a die before it was subjected to CIP at a pressure of 300 MPa. Further, the green body was sintered in oxygen under the conditions at 920° C. for 48 hours.

Figure 3:
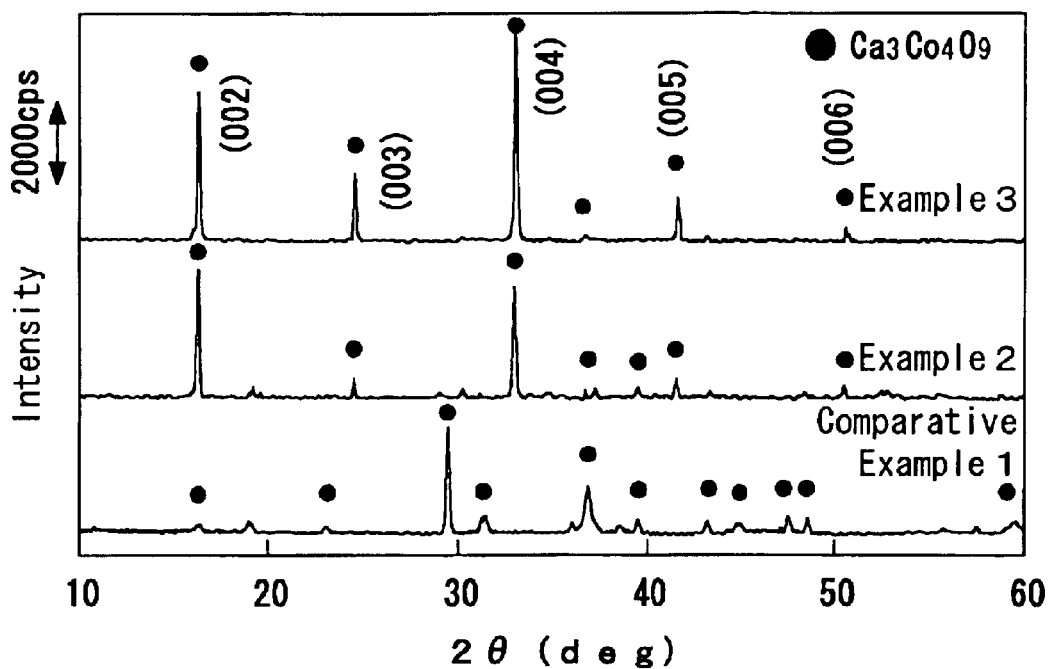
FIG. 3 is a view showing X-ray diffraction patterns of the grain oriented ceramics obtained in Examples 2 and 3 and non-oriented ceramics obtained in Comparative Example 1.

FIG. 3 shows X-ray diffraction patterns of the sintered bodies obtained in Examples 2 and 3 and Comparative Example 1 measured with respect to a plane parallel to the tape plane or a molded plane. Although the crystal structure of $Ca_3Co_4O_9$ has not been elucidated in detail, FIG. 3 includes Miller indexes in accordance with the abovementioned report from A. C. Masset et al. (A. C. Masset et al., Phys. Rev. B, 62(1), pp. 166–175, 2000). FIG. 3 points to a fact that the {001} planes of the sintered bodies obtained in Examples 2 and 3 were oriented at higher degrees of orientation than that obtained in Comparative Example 1.

In addition, an average orientation degree of the {001} plane by the Lotgering's method was obtained from the findings shown in FIG. 3 and the Expression 1. As a result, the average orientation degree of Comparative Example 1 was 2% while those of Examples 2 and 3 were 73% and 92%, respectively.

Next, in a direction parallel to the tape plane or the molded plane, sample bars were cut from the sintered bodies obtained in Examples 3 to 5 and Comparative Example 1. Subsequently, using those sample bars, Seebeck coefficient, thermal conductivity and electrical conductivity were measured in the direction parallel to the tape plane or the molded plane within a temperature range from 200 to 700° C. Further, the obtained Seebeck coefficient, electrical conductivity and thermal conductivity were used to calculate the dimensionless figure of merit ZT. The results are shown in FIG. 4.

Figure 4:
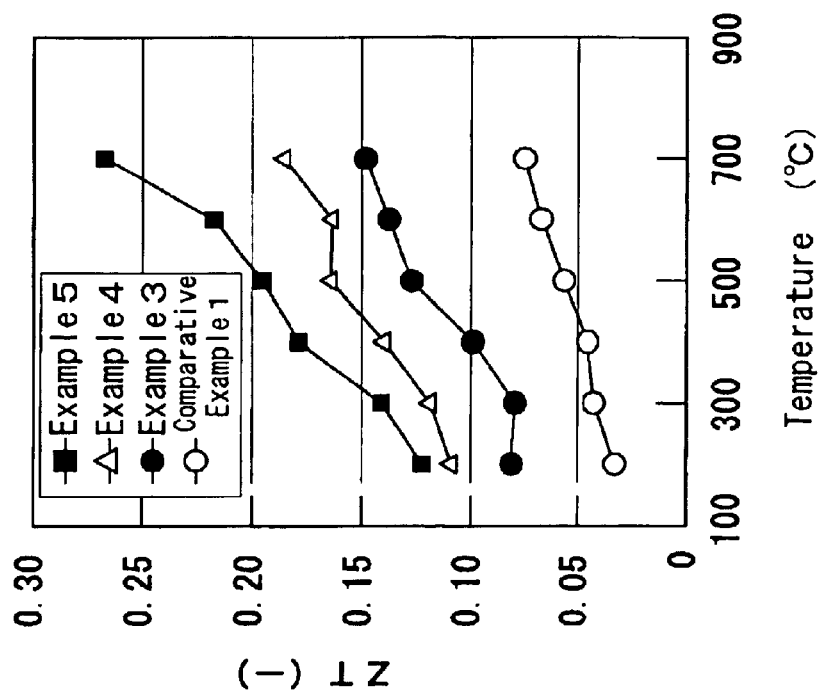
FIG. 4 is a view showing a relationship between temperatures and dimensionless figures of merit for the grain oriented ceramics obtained in Examples 3 to 5 and the non-oriented ceramics obtained in Comparative Example 1.

FIG. 4 indicates that the oriented sintered body obtained in Example 3 had a higher dimensionless figure of merit ZT than the non-oriented sintered body of Comparative Example 1 throughout all the temperature ranges. The reason is that unidirectionally orienting the {001} plane excellent in electrical conductivity improved the electrical conductivity in the direction parallel to the tape plane.

In addition, FIG. 4 indicates that, substituting Na for part of Ca contained in $Ca_3Co_4O_9$ increases the dimensionless figure of merit ZT, and that the more the amount of Na substitution, the higher the dimensionless figure of merit ZT becomes. In example 4 where the amount of Na substitution was 10 atm %, the dimensionless figure of merit ZT at 700° C. reached 0.27. The reason is that substituting Na for part of Ca contained in the second sublattice increased electrical conductivity of the $CoO_2$ layer; that is, the electrical conductivity in the direction parallel to the tape plane.

EXAMPLE 6

Grain oriented ceramics composed of $\{Ca_{0.9}Bi_{0.1}\}_3Co_4O_9$ were prepared through the same steps as in Example 2, except that the $Co(OH)_2$ platelike powder obtained in Example 1, a $CaCO_3$ powder (average grain size: $0.2 \leq m$) and a $Bi_2O_3$ powder (average grain size: 0.3 μm) were mixed at a stoichiometric ratio.

Under the same conditions as in Example 3, the average orientation degree by the Lotgering's method and the dimensionless figure of merit were measured for the {001} plane of the grain oriented ceramics obtained. As a result, the average orientation degree of the {001}) plane was 82%, and the dimensionless figure of merit ZT at 600 K was 0.16.

Comparative Example 2

Non-oriented ceramics composed of $\{Ca_{0.09}Bi_{0.1}\}_3Co_4O_9$ was prepared through the same steps as in Example 6, except that a $Co(OH)_2$ powder (average grain size: 0.1 μm) with irregular shapes and an aspect ratio between 1 and 2 was used instead of a $Co(OH)_2$ platelike powder.

Under the same conditions as in Example 2, the average orientation degree by the Lotgering's method and the dimensionless figure of merit were measured for the {001} plane of the non-oriented ceramics obtained. As a result, the average orientation degree of the {001} plane was 10%, and the dimensionless figure of merit ZT at 600 K was 0.091.

EXAMPLE 7

Grain oriented ceramics composed of $Bi_2Sr_2Co_2O_9$ was prepared through the same steps as in Example 2, except that the $Co(OH)_2$ platelike powder obtained in Example 1, a $Bi_2O_3$ powder (average grain size: 0.3 μm) and a $SrCO_3$ powder (average grain size: 0.3 μm) were mixed at a stoichiometric ratio.

Under the same conditions as in Example 3, the average orientation degree by the Lotgering's method and the dimensionless figure of merit were measured for the {001} plane of the grain oriented ceramics obtained. As a result, the average orientation degree of the {001} plane was 71%, and the dimensionless figure of merit ZT at 600 K was 0.097.

Comparative Example 3

The same steps as in Example 7 were performed to prepare non-oriented ceramics composed of $Bi_2Sr_2Co_2O_9$, except that a $Co(OH)_2$ powder (average grain size: 0.1 μm) with irregular shapes was used instead of a $Co(OH)_2$ platelike powder.

Under the same conditions as in Example 2, the average orientation degree by the Lotgering's method and the dimensionless figure of merit were measured for the {001} plane of the non-oriented ceramics obtained. As a result, the average orientation degree of the {001} plane was 8%, and the dimensionless figure of merit ZT at 600 K was 0.035.

EXAMPLE 8

Figure 5:
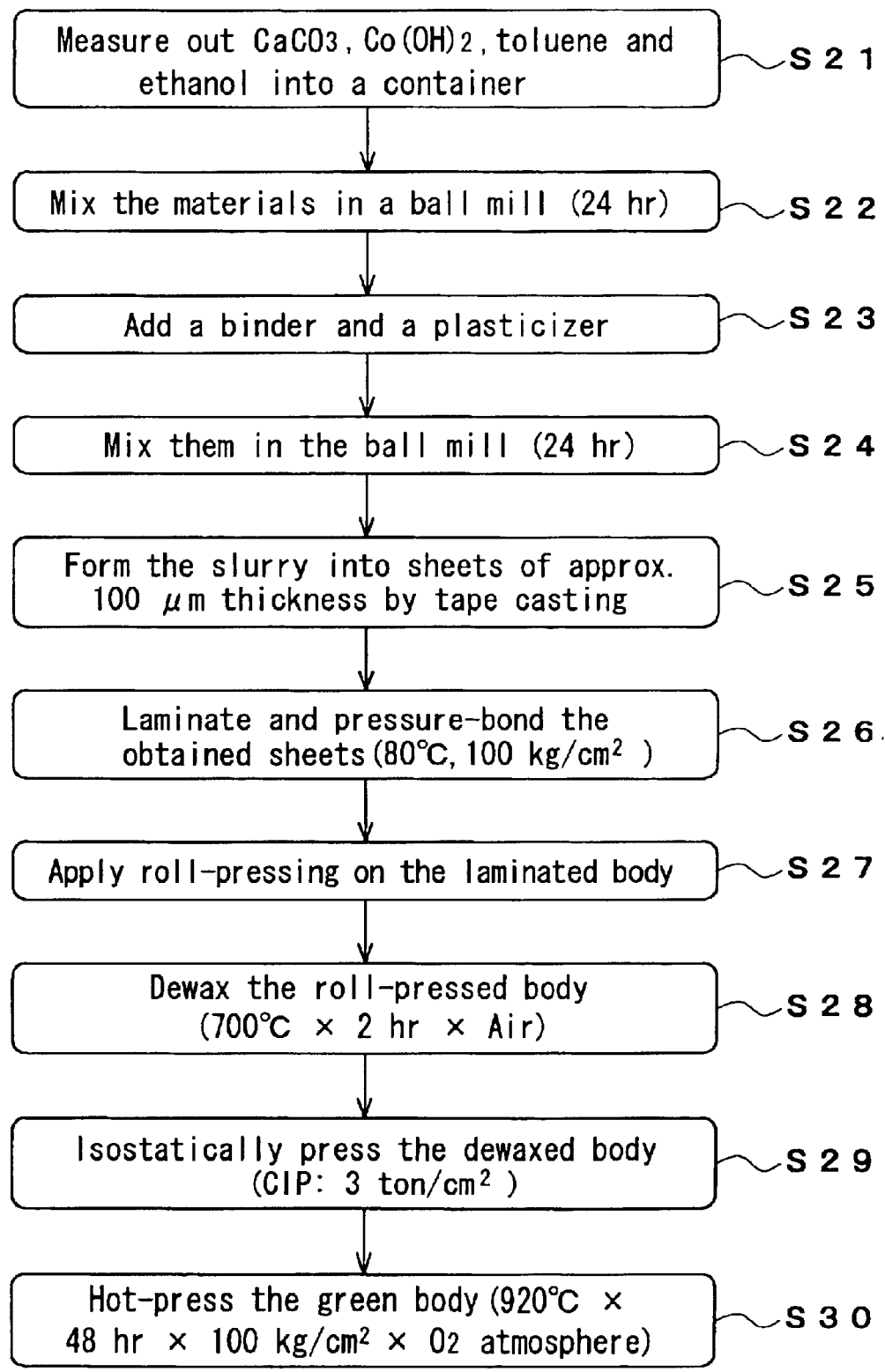
FIG. 5 is a flow chart showing a production process of grain oriented ceramics according to the second embodiment of the present invention.

Grain oriented ceramics composed of $Ca_3Co_4O_9$ were prepared through the steps shown in FIG. 5. First, in Step 21, predetermined amounts of a $CaCO_3$ powder (average grain size: 0.2 μm), the $Co(OH)_2$ platelike powder synthesized in Example 1, toluene and anhydrous ethanol were measured out into a container. Subsequently, these materials were wet-mixed in a ball-mill for 24 hours (S22). After completion of the mixing, predetermined amounts of a binder and a plasticizer were added to the slurry (S23), and they were wet-mixed in a ball-mill for another three hours (S24). The amounts of those materials to be charged were the same as those in Example 2.

Next, the slurry was molded into 100 μm-thick sheets by tape casting (S25). The obtained sheets were then laminated and pressure-bonded under the conditions at a temperature of 80° C. and at a pressure of 100 $kg/cm^2$ (9.8 MPa) (S26). Further, the laminated body was subjected to a roll-pressing treatment (S27). In this example, the roll-pressing temperature was set at room temperature, and the thickness reduction ratio was set at 30%.

Next, the green body thus obtained was dewaxed in air under the conditions at 700° C for two hours (S28) Subsequently, the green body having been dewaxed was subjected to a CIP treatment (cold isostatic pressing) under the condition at a pressure of 3 $ton/cm^2$ (294 MPa) (S29). Further, the green body was hot-pressed in oxygen under the conditions at 920° C. for 48 hours and at a pressure of 100 $kg/cm^2$ (9.8 MPa) (S30)

EXAMPLE 9

The same steps as in Example 8 were performed to prepare grain oriented ceramics, except that the roll-pressing temperature for the roll-pressing treatment (S27) was set at 60° C.

EXAMPLE 10

The same steps as in Example 8 were performed to prepare grain oriented ceramics, except that the roll-pressing treatment (S27) was not conducted.

In each of the green bodies which have been obtained in Examples 8 to 10 and not yet been dewaxed, an average orientation degree by the Lotgering's method Q (HKL) was measured for the {001} plane of a $Co(OH)_2$ powder. Also, in each of the sintered bodies obtained in Examples 8 to 10, an average orientation degree by the Lotgering's method Q (HKL) was measured for the {001} plane of the layered cobaltite, and a rocking curve full width at half maximum (RC FWHM) was measured for the (004) plane. The results are shown in Table 2.

It should be noted that the measurement of the RC FWHM of the (004) plane was conducted with Cu-Kα used as a X-ray source and under the conditions with DS (Divergence Slit) of ½°, SS (Scattering Slit) of ½° and RS (Receiving Slit) of 0.15 mm. The RC FWHM in Table 2 show the values obtained by subtracting a value of the device-specific FWHM from each of the measured values of the RC FWHM.

TABLE 2

| | Orientation degree of the green body | Orientation degree of the sintered body | |
|---|---|---|---|
| | Q (HKL) | Q (HKL) | RC FWHM |
| Example 10 | 52.6% | 99.7% | 15.7° |
| Example 8 | 78.9% | 99.8% | 10.1° |
| Example 9 | 82.4% | 99.8% | 9.3° |

In the green body of Example 10 without roll-pressing treatment, the average orientation degree by the Lotgering's method Q (HKL) was 52.6%. In contrast to this, in the green bodies of Examples 8 and 9, the average orientation degree Q (HKL) increased to 78.9% and 82.4%, respectively.

On the other hand, every sintered body had an average orientation degree by the Lotgering's method Q (HKL) exceeding 99% irrespective of whether the roll-pressing was applied or not. The RC FWHM of the sintered body varied widely depending on the presence or absence of roll-pressing and the roll-pressing conditions. That is, while the RC FWHM in Example 10 was 15.70, those in Examples 8 and 9 were 10.1° and 9.3°, respectively, and the orientation degree of the {001} plane increased. Table 2 indicates that the RC FWHM of the sintered body depends greatly on the orientation degree of the green body.

Figure 6:
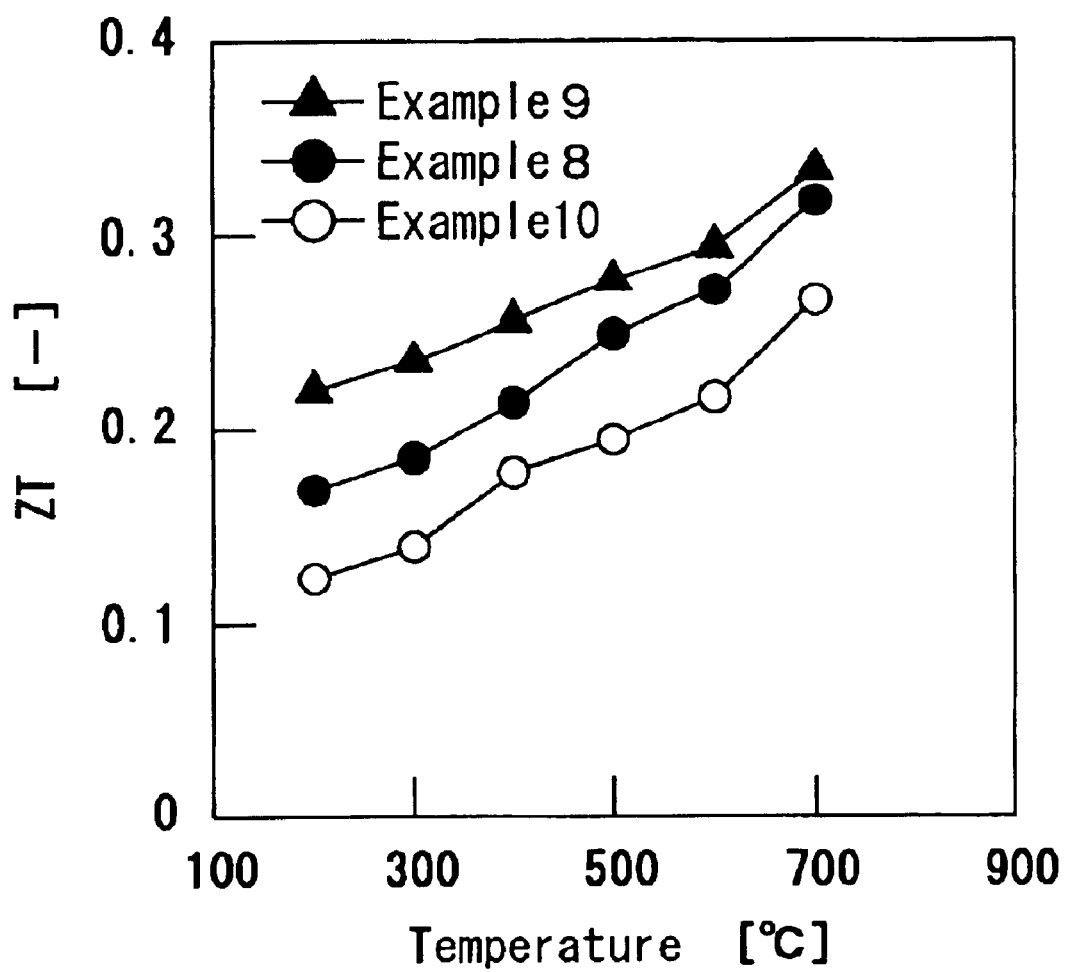
FIG. 6 is a view showing a relationship between temperatures and dimensionless figures of merit for the grain oriented ceramics obtained in Examples 9 to 10.

Next, in a direction parallel to the tape plane, sample bars were cut from the sintered bodies obtained in Examples 8 to 10. Subsequently, using those sample bars, a Seebeck coefficient, thermal conductivity and electrical conductivity were measured in the direction parallel to the tape plane within a temperature range from 200 to 700° C. Further, the obtained Seebeck coefficient, electrical conductivity and thermal conductivity were used to calculate the dimensionless figure of merit ZT. FIG. 6 shows the relationship between the measurement temperatures and the dimensionless figures of merit.

FIG. 6 indicates that, throughout all the temperature ranges, the dimensionless figure of merit ZT is higher in the sintered bodies obtained in Example 8 and 9 than that in Example 10. It is also indicated that the smaller the RC FWHM, the higher the dimensionless figure of merit ZT. The reason is that, when the {001} plane having higher electrical conductivity was unidirectionally oriented at an extremely high degree of orientation, the electrical conductivity in the direction parallel to the tape plane increased correspondingly, thereby increasing the figure of merit Z.

EXAMPLE 11

Grain oriented ceramics composed of $Ca_3Co_{4.2}Cu_{1.2}O_9$ were prepared through the same steps as in Example 2, except that the $Co(OH)_2$ platelike powder obtained in Example 1, a $CaCO_3$ powder (average grain size: 0.2 μm) and a CuO powder (average grain size: 0.2 μm) were mixed at a stoichiometric ratio.

Under the same condition as in Example 3, the average orientation degree by the Lotgering's method and the dimensionless figure of merit were measured for the {001} plane of the grain oriented ceramics obtained. As a result, the average orientation degree of the {001} plane was 82%, and the dimensionless figure of merit ZT at 600 K was 0.18.

Comparative Example 4

The same steps as in Example 11 were performed to prepare non-oriented ceramics composed of $Ca_3Co_{4.2}Cu_{1.2}O_9$, except that a $Co(OH)_2$ powder (average grain size: 0.1 μm) with irregular shapes was used instead of a $Co(OH)_2$ platelike powder.

Under the same condition as in Example 2, the average orientation degree by the Lotgering's method and the dimensionless figure of merit were measured for the {001} plane of the non-oriented ceramics obtained. As a result, the average orientation degree of the {001} plane was 9%, and the dimensionless figure of merit ZT at 600 K was 0.10.

While the preferred embodiments of the present invention have been described in detail, it is to be understood that the present invention is not limited thereto, and variations and modifications may be made without departing from the spirit and scope thereof.

As a sintering method, for instance, the normal sintering method or the hot pressing was used in the examples described above. Instead, it is also possible to conduct another sintering method, such as, normal sintering plus HIP treatment. Besides, the doctor blade method and the roll-pressing method were used in the above examples so that the orientation degree of the crystal plane A in the green body would be at a predetermined value or greater. However, another molding method may be used as long as the orientation degree of the crystal surface A is enhanced.

Additionally, in the above examples, a platelike powder was plane-oriented by tape casting by means of the doctor blade method, but it is also possible that they may be axis-oriented by the extrusion molding method. Axis-orienting a platelike powder under such a method may also produce grain oriented ceramics having a higher figure of merit than a non-oriented sintered body. Also, the extrusion molding method has an advantage of permitting low-cost preparation of a sintered body having a reasonable degree of thickness.

Furthermore, in the case of forming a layered cobaltite by adding the second powder to the first powder constituted of a precursor of the layered cobaltite, it is also possible to use, as the second powder, a powder with irregular shapes constituted of a precursor of the same composition. In this case, the powder with irregular shapes may be mixed at a specific ratio associated with the compositions of other powders and their mixing ratio so as to obtain a desired grain oriented ceramics.

In addition, the first powder may be used alone where an anisotropically-shaped powder constituted of a layered cobaltite is used as the first powder. Alternatively, the first powder may be mixed, at a specific ratio, with the second powder having a composition ratio capable of forming a layered cobaltite to be prepared, and/or the third powder with irregular shapes and the same composition as the layered cobaltite to be prepared.

What is more, since the grain oriented ceramics according to the present invention show high figure of merit, it is suitable particularly as a thermoelectric conversion material constituting thermoelectric conversion elements used in thermoelectric generators, accurate temperature control devices, thermostats, air conditioners, refrigerators and electrical power sources for clocks. However, the applications of the present invention are not limited thereto, and the invention is also applicable to a variety of electronic devices using a giant magneto resistance effect (e.g. magnetic heads)

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A grain oriented ceramic comprising a polycrystalline body of a layered cobaltite, wherein a {001}plane of each grain constituting the polycrystalline body has an average orientation degree of 71% or more by the Lotgering's method, wherein the layered cobaltite comprises alternately piled layers of a first sublattice comprising a $CoO_2$ layer and a second sublattice comprising a layer different from the $CoO_2$, layer.

2. The grain oriented ceramic according to claim 1, wherein the second sublattice comprises a layer with a pseudo rock-salt structure that has a rock-salt structure or a distorted rock-salt structure.

3. The grain oriented ceramic according to claim 1, wherein the layered cobaltite has the following formula:

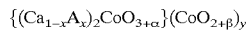

$$\{(Ca_{1-x}A_x)_2CoO_{3+\alpha}\}(CoO_{2+\beta})_y$$

wherein A represents at least one substitute element selected from the group consisting of an alkali metal, an alkaline earth metal and Bi, $0 \leq x \leq 0.3$ $0.5 \leq y \leq 2.0$, and $0.85 \leq \{3+\alpha+(2+\beta)y\}/(3+2y) \leq 1.15$.

4. The grain oriented ceramic according to claim 3, wherein the layered cobaltite comprises at least one substitute element C selected from the group consisting of Cu, Sn, Mn, Ni, Fe, Zr and Cr, present in an amount of from 0 to 25 atm % based on the amount of Co and substituted element C.

5. The grain oriented ceramic according to claim 1, wherein the layered cobaltite has the following formula:

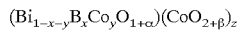

$$(Bi_{1-x-y}B_xCo_yO_{1+\alpha})(CoO_{2+\beta})_z$$

wherein B represents at least one substitute element selected from the group consisting of an alkali metal and an alkaline earth metal, $0.2 \leq x \leq 0.8$, $0 \leq y < 0.5$, $0.2 \leq x+y \leq 1$, $0.25 \leq z \leq 0.5$, and $0.85 \leq \{1+\alpha+(2+\beta)z\}/(1+2z) \leq 1.15$.

6. The grain oriented ceramic according to claim 5, wherein the layered cobaltite comprises at least one substitute element C selected from the group consisting of Cu, Sn, Mn, Ni, Fe, Zr and Cr, present in an amount of from 0 to 25 atm % based on the amount of Co and the substituted element C.

7. The grain oriented ceramic according to claim 1, wherein the layered cobaltite has the following formula:

$$(Ca_{1-x}A_xCo_{1-y}Cu_yO_{4+\alpha})(CoO_{2+\beta})_z$$

wherein A represents at least one substitute element selected from the group consisting of an alkali metal, an alkaline earth metal and Bi, $0 \leq x \leq 0.3$, $0.25 \leq y < 0.5$, $0.6 \leq z \leq 1.0$, and $0.85 \leq \{4+\alpha+(2+\beta)z\}/(4+2z) \leq 1.15$.

8. The grain oriented ceramic according to claim 7, wherein the layered cobaltite comprises at least one substitute element C selected from the group consisting of Sn, Mn, Ni, Fe, Zr and Cr, present in an amount of from 0 to 15 atm % based on the amount of Co and the substituted element C.

9. The grain oriented ceramic according to claim 1, wherein a rocking curve full width at half maximum measured for the {001} plane of the layered cobaltite is 15 degrees or less.

10. A production process of grain oriented ceramics comprising:

preparing a material comprising a first powder with a crystal plane A that has lattice matching with a $CoO_2$ layer of a layered cobaltite;

molding the material to orient the crystal plane A; and heating and sintering a green body obtained by molding to form a grain oriented ceramic comprising a polycrystalline body of a layered cobaltite, wherein a {001} plane of each grain constituting the polycrystalline body has an average orientation degree of 71% or more by the Lotgering's method, wherein the layered cobaltite comprises alternately piled layers of a first sublattice comprising a $CoO_2$, layer and a second sublattice comprising a layer different from the $CoO_2$ layer.

11. The production process of grain oriented ceramics according to claim 10, wherein the first powder has an anisotropic shape with the crystal plane A as its developed plane.

12. The production process of grain oriented ceramics according to claim 10, wherein the first powder is a precursor of the layered cobaltite.

13. The production process of grain oriented ceramics according to claim 12, wherein the first powder is at least one selected from the group of a platelike powder of $Co(OH)_2$ with a {001} plane as its developed plane, a platelike powder of CoO with a {111} plane as its developed plane, a platelike powder of $Co_3O_4$ with a {111} plane as its developed plane, and a platelike powder of CoO(OH) with a {001} plane as its developed plane.

14. The production process of grain oriented ceramics according to claim 12, wherein, in the material preparation step, the material further comprises a second powder that reacts with the first powder thereby forming the layered cobaltite.

15. The production process of grain oriented ceramics according to claim 10, wherein the first powder comprises the layered cobaltite.

16. The production process of grain oriented ceramics according to claim 15, wherein the first powder is a platelike powder of the layered cobaltite with the {001} plane as its developed plane.

17. The production process of grain oriented ceramics according to claim 10, wherein heating and sintering the green body are conducted in an atmosphere containing oxygen.

18. The production process of grain oriented ceramics according to claim 10, wherein, in the molding step, the material is molded such that the crystal plane A has an average orientation degree of 55% or more by the Lotgering's method.

19. The production process of grain oriented ceramics according to claim 18, wherein the first powder is an anisotropically-shaped powder having the crystal plane A as its developed plane.

20. The production process of grain oriented ceramics according to claim 18, wherein the first powder is a precursor of the layered cobaltite.

21. The production process of grain oriented ceramics according to claim 18, wherein the first powder is the layered cobaltite.

22. The production process of grain oriented ceramics according to claim 19, wherein the molding step comprises a roll-pressing step of roll-pressing a material comprising the anisotropically-shaped powder or a green body of that material.

23. A production process of grain oriented ceramics according to claim 22, wherein the green body is a tape in which the developed plane of the anisotropically-shaped powder is oriented in parallel to a tape plane, or a laminated body of the tapes.

24. A thermoelectric conversion element comprising the grain oriented ceramic defined in claim 1.

25. A thermoelectric conversion element comprising the grain oriented ceramic defined in claim 10.

26. The grain oriented ceramic of claim 1, wherein the {001} plane of each grain constituting the polycrystalline body has an average orientation degree of 92% or more by the Lotgering's method.

27. The grain oriented ceramic of claim 1, wherein the {001} plane of each grain constituting the polycrystalline body has an average orientation degree of from 71% to 92% by the Lotgering's method.

* * * * *